United States Patent
Grosse Bley

Patent Number: 5,537,857
Date of Patent: Jul. 23, 1996

[54] LEAK INDICATOR FOR VACUUM SYSTEMS AND A METHOD OF SEARCHING FOR LEAKS IN VACUUM SYSTEMS

[75] Inventor: Werner Grosse Bley, Bonn, Germany

[73] Assignee: Leybold AG, Germany

[21] Appl. No.: 244,522

[22] PCT Filed: Oct. 14, 1992

[86] PCT No.: PCT/EP92/02364

§ 371 Date: Jun. 1, 1994

§ 102(e) Date: Jun. 1, 1994

[87] PCT Pub. No.: WO93/12411

PCT Pub. Date: Jun. 24, 1993

[30] Foreign Application Priority Data

Dec. 7, 1991 [DE] Germany ............ 41 40 366.5

[51] Int. Cl.⁶ ............ G01M 3/20; B01D 57/00
[52] U.S. Cl. ............ 73/40.7; 73/40
[58] Field of Search ............ 73/40.7, 40.5, 73/40

[56] References Cited

U.S. PATENT DOCUMENTS

| | | | |
|---|---|---|---|
| 4,735,084 | 4/1988 | Fruzzetti | 73/40.7 |
| 4,773,256 | 9/1988 | Saulgeot | 73/40.7 |
| 4,776,207 | 10/1988 | Holme | 73/40.7 |
| 4,779,449 | 10/1988 | Bley et al. | 73/40.7 |
| 5,049,168 | 9/1991 | Danielson | 55/17 |
| 5,131,263 | 7/1992 | Handke et al. | 73/40.7 |
| 5,168,747 | 12/1992 | Weaver et al. | 73/40.7 |
| 5,297,422 | 3/1994 | Baret | 73/40.7 |
| 5,317,900 | 6/1994 | Bergquist | 73/40.7 |

FOREIGN PATENT DOCUMENTS

| | | |
|---|---|---|
| 0268777 | 6/1988 | European Pat. Off. |
| 0283543 | 9/1988 | European Pat. Off. |
| 0444434 | 9/1991 | European Pat. Off. |
| 2713580 | 10/1978 | Germany |
| 3316765 | 11/1984 | Germany |

Primary Examiner—Hezron E. Williams
Assistant Examiner—J. David Wiggins
Attorney, Agent, or Firm—Harris Beach & Wilcox

[57] ABSTRACT

A leak indicator for detecting leaks in a vacuum system including a chamber and a system vacuum pump. The indicator is provided with a mass spectrometer for identifying the presence of a test gas in the system chamber and a high vacuum pump for producing the pressure required for operation of the mass spectrometer during a system leak test. A sealed conduit network is provided to connect the system chamber to the inlet of the mass spectrometer, and to the inlet side and exhaust side of the high vacuum pump. A first switching valve is provided within the sealed conduit in series between the system chamber and the inlets of the mass spectrometer and the high vacuum pump. Lastly, a constriction member is connected within the network conduit in series between the system chamber and the first switching valve to selectively provide a direct connection between the system chamber and the inlet side of the high vacuum pump, or between the system chamber and the exhaust side of the high vacuum pump.

11 Claims, 1 Drawing Sheet

LEAK INDICATOR FOR VACUUM SYSTEMS AND A METHOD OF SEARCHING FOR LEAKS IN VACUUM SYSTEMS

BACKGROUND OF THE INVENTION

1. Field of the Invention

The invention concerns a leak indicator for vacuum systems comprising a chamber which is evacuated while the system is in operation plus a vacuum pump used to evacuate the chamber whereby the leak indicator has a test-gas detector in the form of a mass spectrometer plus a high vacuum pump to produce the vacuum necessary for operation of the mass spectrometer.

2. Discussion of the Related Art

Before operation, after maintenance or repair work and also after other interruptions of operation, vacuum systems must be tested for the presence of leaks so as to ensure optimum operating conditions of the vacuum system which are not adversely influenced by flows of leaking gas.

From DE-OS 33 16 765 a method and device is known for the detection of leaks on turbine casings. A low pressure is maintained in the turbine casings with the aid of vacuum pumps. For the purpose of leak detection all parts of the turbine casing where a leak is suspected are sprayed from the outside with a test gas, preferably helium. The exhaust gas of the vacuum pumps is monitored with the aid of a sniffer leak indicator so that the presence of any leaks can be determined. Leak detection of this kind is relatively insensitive.

Moreover, the leak detection arrangement for this task is fairly large and heavy, because such an arrangement must include a complete high vacuum system with a heavy backing pump.

OBJECTS AND SUMMARY OF THE INVENTION

It is the object of the present invention to increase detection sensitivity of the leak detection process on vacuum systems while at the same time reducing the technical complexity of the arrangement.

This object is accomplished according to the present invention by leak indicator as outlined above by making the chamber of the vacuum system connectable to the inlet and/or exhaust side of the high vacuum pump in the leak indicator via a constriction. The introduction of a suitably rated constriction ensures that the pressure in the mass spectrometer remains sufficiently low. Due to the direct connection between the chamber of the vacuum system and the leak indicator, the flow paths for the test gas between a possibly present leak and the mass spectrometer detector are considerably shorter compared to the state-of-the-art thereby offering improved sensitivity and a reduction of complexity.

A particularly advantageous further development is, that the constriction is made to act as a control valve. With the aid of this control valve the gas flowing into the mass spectrometer detector can be throttled in such a way, that the pressure in the mass spectrometer can be maintained at a constant level, irrespectively of the process pressure in the system and this preferably at an optimum high total pressure of approximately $10^{-4}$ mbar. In such a mode of operation the leak indicator will operate as a concentration measuring instrument for the test gas, so that the interfering gas concentration in the process is indicated to the persons responsible for running the process. Concentration changes are measured correctly and independently of any total pressure variations during the process, even if the leak rate itself remains constant (the leak rate is only the cause for the quantity of the gas concentration which interferes with the process).

A further advantageous measure is, to employ a pump system in the leak indicator which consists of a high vacuum pump and a further pumping stage, so that on the pressure side of the pump system a pressure can be produced which is of the same order of magnitude compared to the operating pressure within the chamber of the vacuum system, 40 mbar, for example. With such a pump system it is possible to connect the exhaust of the pump system to the chamber of the vacuum system, so that it will no longer be required to equip the leak indicator itself with a backing pump. Thus the leak indicator is light-weight and especially handy which is of great importance especially during leak detection on large fixed installations.

BRIEF DESCRIPTION OF THE DRAWING

Further objectives, advantages and details of the invention will become apparent from the following description taken in conjunction with the examples in drawing FIGS. 1 to 3, wherein.

DETAILED DESCRIPTION OF THE INVENTION

Figure 1:
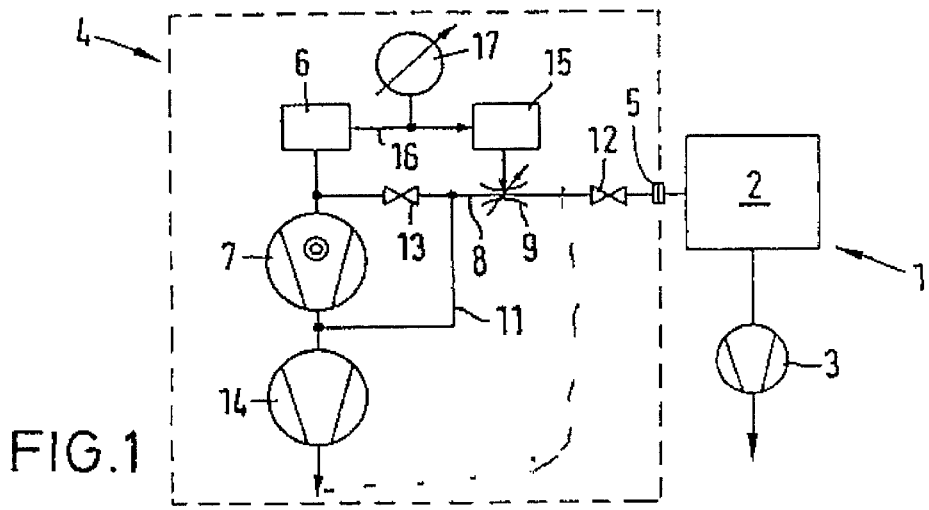
FIG. 1 is a schematic representation of a first example of the present vacuum system leak indicator.

Shown in the drawing figures is the vacuum system 1 in which leaks are to be detected, its vacuum chamber 2 and the pump 3 which belongs to the vacuum system 1.

The leak indicator which is generally marked 4 is directly connectable via flange connection 5 to chamber 2. It comprises mass spectrometer detector 6 and high vacuum pump 7 which is preferably a turbomolecular pump. Via line 8 with constriction 9 the chamber 2 may be connected directly to the inlet side of the high vacuum pump, i.e. directly to detector 6. A line 11 leading to the exhaust side of the high vacuum pump branches off from line 8—in the flow direction of a possibly flowing test gas from chamber 2 to mass spectrometer detector 6—after constriction 9 so that the chamber 2 of vacuum system 1 may also be connected via constriction 9 to this point on leak indicator 4. Switching valves 12 and 13 control the desired gas flow.

In the example according to drawing FIG. 1 the high vacuum pump 7 is followed by a common backing pump 14. The leak detection process is performed in such a way, that the chamber 2 of vacuum system 1 is sprayed from the outside with test gas. In order to determine a possibly present coarse leak, the connection between chamber 2 and the exhaust side of the high vacuum pump 7 is initially provided via the constriction 9 (valve 12 open, valve 13 closed). Any test gas which might flow through this path enters into the mass spectrometer 6 against the pumping direction of the high vacuum pump 7, whereby the indicating devices for the mass spectrometer 6 are not shown. The sensitivity of the leak detection process can be increased by opening valve 13 so that the test gas is admitted directly to the detector.

The size of constriction 9 must be such, that the pressure required for operation of the mass spectrometer 6 is not exceeded. It is particularly advantageous to let the constriction act as a control valve which is controlled by the pressure in the mass spectrometer 6 in such a way, that this pressure is maintained at a constant level. In this mode of operation the leak indicator will operate as a concentration measuring instrument, whereas in the case of a fixed constriction or when the control valve 9 is set to a fixed value, it will function as a leak rate measuring instrument. The means used to control the control valve 9 are only shown schematically in drawing FIG. 1. They comprise the control system 15 shown as a block which is supplied with the necessary information concerning the pressure in the mass spectrometer detector 6 via line 16. Number 17 is used to mark a pressure gauge which indicates the pressure in detector 6. A pressure rise in chamber 2 will result in a pressure rise also in the detector 6 when the constriction 9 is set to a fixed value. In the case of a rising pressure in chamber 2 the presented control system will provide a stronger throttling effect of control valve 9, so that the pressure in detector 6 is maintained at a constant level.

Figure 2:
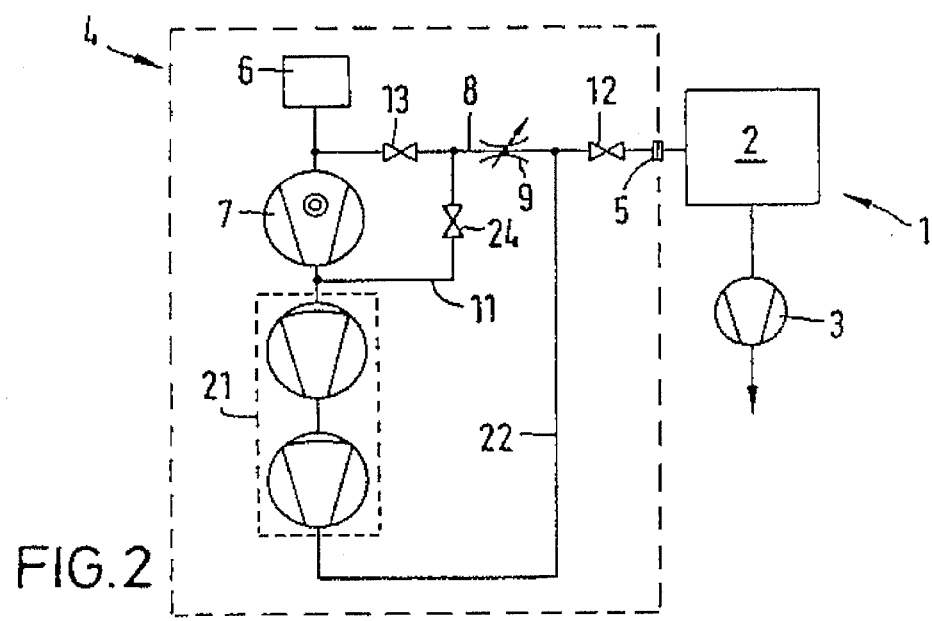
FIG. 2 is another schematic representation of a second example of a leak indicator in accordance with the present invention.

In the example according to drawing FIG. 2 the high vacuum pump 7 is followed by a diaphragm pump 21 which is of a dual-stage design. It is preferably designed in such a way, that it is capable of producing an exhaust pressure of about 40 to 100 mbar based on an inlet pressure of about 0.1 mbar. In this case it is possible to connect the exhaust line 22 to the chamber 2 so that a blocking pump in leak indicator 4 which compresses the gas to atmospheric pressure is not required. In order to avoid two connection lines between chamber 2 and the leak indicator 4, line 22 leads into line 8 within the leak indicator 4 at a point between the inlet valve 2 and the constriction 9.

Figure 3:
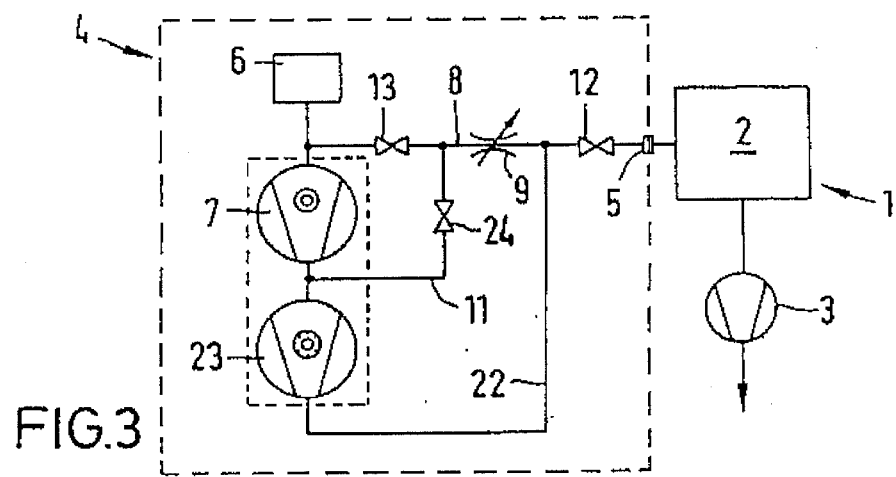
FIG. 3 is yet another schematic representation of a third example of the present leak indicator according to this invention.

In the example according to drawing FIG. 3 the pump which follows the high vacuum pump 7 is of the screw or molecular pump stage type 23. Combined turbomolecular/molecular vacuum pumps the rotors of which are arranged on a common shaft, are known in the mean time and also exhibit the forevacuum capabilities described in the example of drawing FIG. 2, so that it also will be possible to return the exhaust line 22 to chamber 2 and so to dispense with a separate blocking pump in leak indicator 4.

With the designs detailed in drawing FIGS. 2 and 3 it is possible to run the leak detection process on the system 1 at three levels of sensitivity. Pre-requisite for this is, that also line 11 be equipped with a valve 24. When wanting to detect particularly large leaks, valves 13 and 24 are closed so that any test gas which possibly enters the chamber 2 can only arrive at the detector 6 via lines 22 and against the pumping direction of pump stages 7, 21 or 7, 23. For the purpose of increasing the sensitivity then first valve 24 and then valve 13 may be opened.

While this invention has been described in detail with reference to certain examples, it should be appreciated that the present invention is not limited to those precise examples. Rather, in view of the present disclosure which describes the best mode for practicing the invention, many modifications and variations would present themselves to those of skill in the art without departing from the scope and spirit of this invention, as defined in the following claims.

What is claimed is:

1. A leak indicator apparatus for detecting leaks in a vacuum system comprising:

a system chamber and a system vacuum pump attached to said system chamber;

a mass spectrometer having an inlet, said mass spectrometer for identifying the presence of a test gas in the system chamber;

a high vacuum pump having a inlet side and an exhaust side, said high vacuum pump with said system pump adapted to produce the low vacuum pressure required for operation of said mass spectrometer during a system leak test;

a sealed conduit network connecting the system chamber to the inlet of said mass spectrometer, and the system chamber to the inlet side and exhaust side of said high vacuum pump;

a first switching valve connected within said sealed conduit network in series between the system chamber and the inlets of said mass spectrometer and said high vacuum pump; and a constriction member connected within said sealed conduit network in series between the system chamber and said first switching valve whereby control of said first switching valve alternatively allows a direct connection between the system chamber and the inlet side of said high vacuum pump, and the system chamber and the exhaust side of said high vacuum pump.

2. The leak indicator apparatus according to claim 1 further including a second switching valve connected within said sealed conduit network between the system chamber and said constriction member, said second switching valve providing a closable fluid connection between the chamber and the conduit network.

3. The leak indicator apparatus according to claim 1 wherein said constriction member is a control valve adapted to vary the pressure difference thereacross.

4. The leak indicator apparatus according to claim 1 further including a dual-stage diaphragm pump connected at one side thereof to the exhaust side of said high vacuum pump and at another side thereof into said sealed conduit network between the system chamber and said constriction member, said dual-stage diaphragm pump capable of producing an output pressure of the same order of magnitude as the pressure within the system chamber.

5. The leak indicator apparatus according to claim 4 further including a third switching valve connected at one side thereof to the exhaust side of said high vacuum pump and at another side thereof into said sealed conduit network between said first switching valve and said constriction member.

6. The leak indicator apparatus according to claim 1 further including a screw pump connected at one side thereof to the exhaust side of said high vacuum pump and at another side thereof into said sealed conduit network between the system chamber and said constriction member, said screw pump capable of producing an output pressure of the same order of magnitude as the pressure within the system chamber.

7. The leak indicator apparatus according to claim 6 further including a third switching valve connected at one side thereof to the exhaust side of said high vacuum pump and at another side thereof into said sealed conduit network between said first switching valve and said constriction member.

8. The leak indicator apparatus according to claim 1 further including a molecular pump connected at one side thereof to the exhaust side of said high vacuum pump and at another side thereof into said sealed conduit network between the system chamber and said constriction member, said molecular pump capable of producing an output pressure of the same order of magnitude as the pressure within the system chamber.

9. The leak indicator apparatus according to claim 8 further including a third switching valve connected at one side thereof to the exhaust side of said high vacuum pump and at another side thereof into said sealed conduit network between said first switching valve and said constriction member.

10. A method for detecting a leak in a vacuum system including a system chamber and a system vacuum pump, said method comprising the steps of:

connecting the system chamber to a leak indicator including a high vacuum pump with inlet side and exhaust side, which high vacuum pump is connected to a mass spectrometer and a control valve as a constriction member in series with a switching valve for fluidly connecting the system chamber directly to either side of the high vacuum pump, where the high vacuum pump with said system pump is adapted to produce the low pressure required for operation of said mass spectrometer during a system leak test;

spraying a test gas tracer proximate areas of the vacuum system suspected of having leaks; and throttling gas flow into the mass spectrometer by adjusting the control valve to maintain a substantially constant pressure within the mass spectrometer.

11. The method according to claim 10 wherein said spraying step includes use of helium as the test gas.

* * * * *